E. McCOY.
AIR BRAKE PUMP LUBRICATOR.
APPLICATION FILED JULY 21, 1919.
1,338,385.
Patented Apr. 27, 1920.
2 SHEETS—SHEET 1.
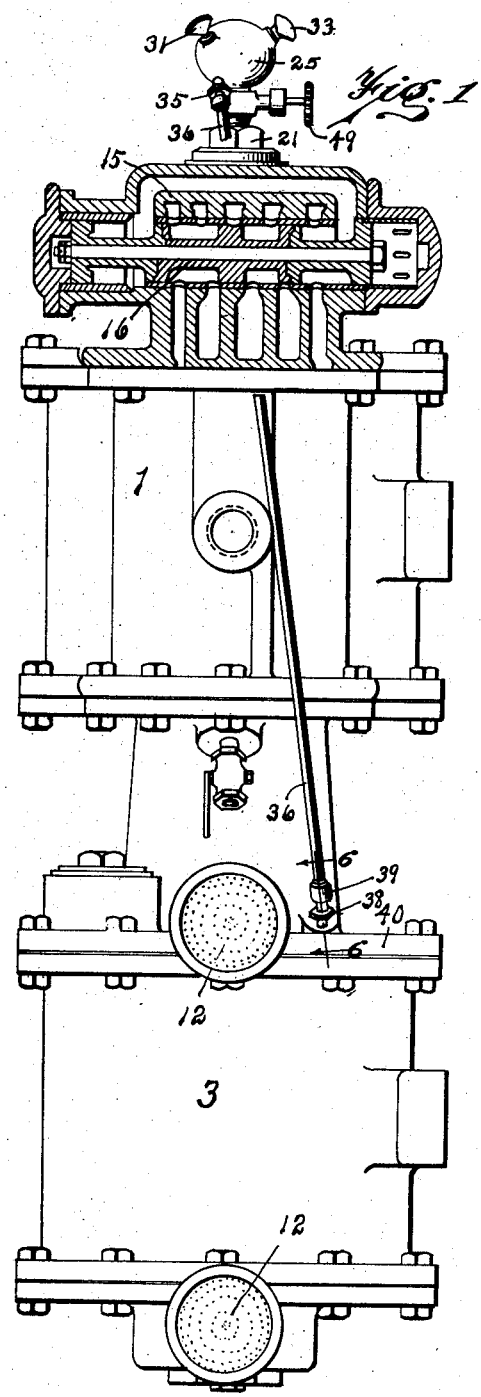
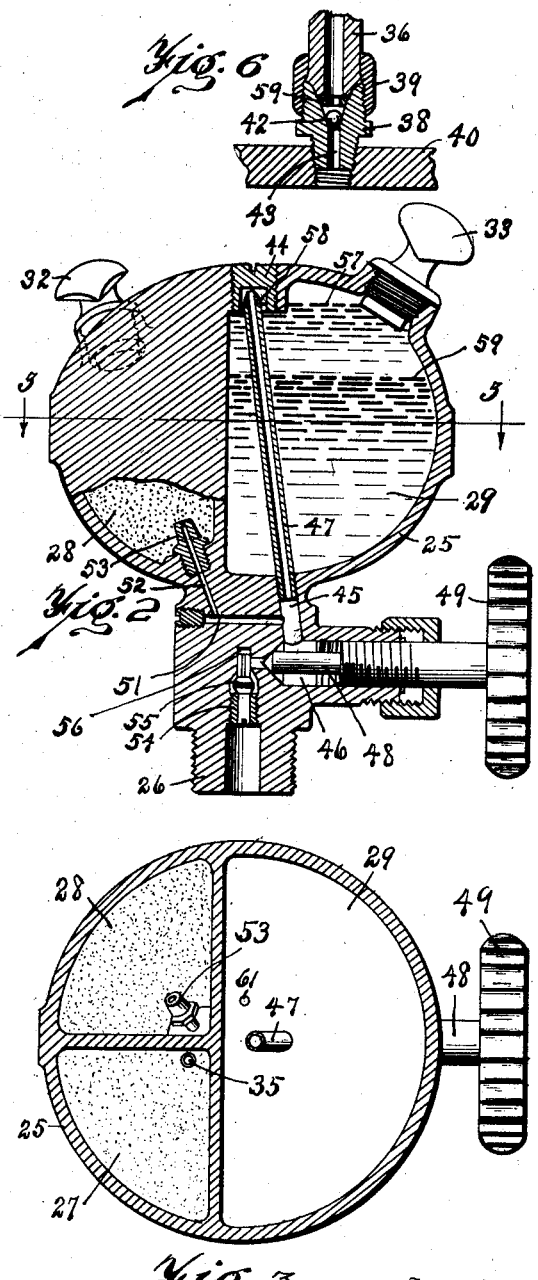
Inventor
Elijah McCoy.
By Edward N. Pagelsen
Attorney

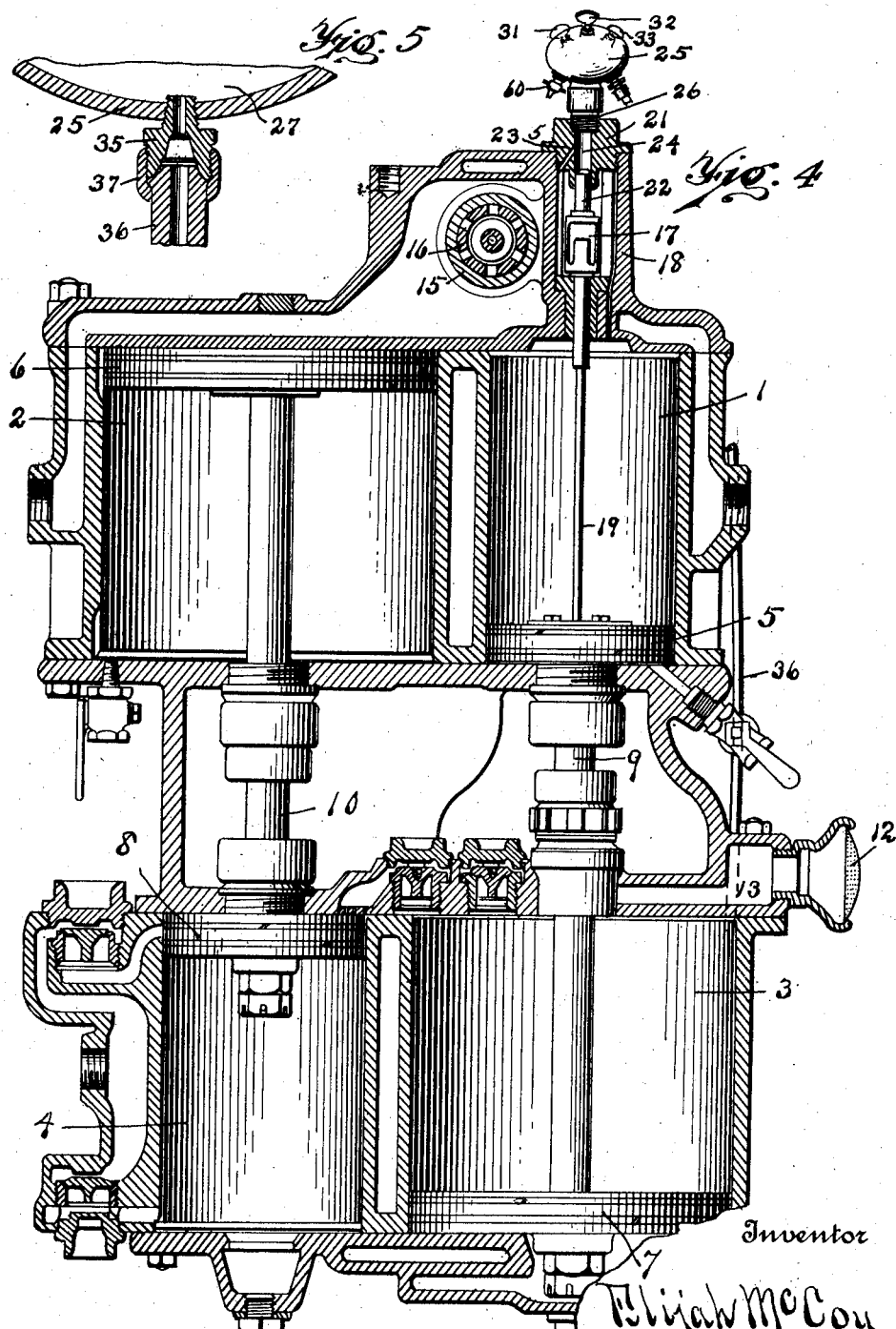

UNITED STATES PATENT OFFICE.

ELIJAH McCOY, OF DETROIT, MICHIGAN, ASSIGNOR TO ELIJAH McCOY MANUFACTURING COMPANY, OF DETROIT, MICHIGAN, A CORPORATION OF MICHIGAN.

AIR-BRAKE-PUMP LUBRICATOR.

1,338,385. Specification of Letters Patent. Patented Apr. 27, 1920.

Application filed July 21, 1919. Serial No. 312,209.

*To all whom it may concern:*

Be it known that I, ELIJAH McCOY, a citizen of the United States, and residing at Detroit, in the county of Wayne and State of Michigan, have invented a new and Improved Air-Brake-Pump Lubricator, of which the following is a specification.

This invention relates to means for lubricating the steam and air cylinders and the pistons therein of air pumps for the brake systems of locomotives and other vehicles, and its object is to provide a lubricating device which will supply a mixture of oil and graphite to the steam cylinder and dry graphite to the air cylinder.

This invention consists of a lubricant receptacle comprising three chambers, one of which may be filled with oil and which connects to a source of steam by means of a pipe extending to nearly the surface of the oil through which the oil may pass from said chamber to a passage which connects with the second chamber containing dry graphite, the oil and the graphite mixing in said passage and passing downward to be taken up by the steam which enters the valve chamber of the steam cylinder of the pump. It further consists in providing a third chamber for graphite and a tube leading therefrom and connecting to the air cylinder of said pump. It further consists in the details of construction illustrated in the accompanying drawings and particularly pointed out in the claims.

In the drawings, Figure 1 is an elevation of an ordinary air brake pump provided with my improved lubricator, the piston valve at the upper end thereof being shown in section. Fig. 2 is a central vertical section of the lubricant container. Fig. 3 is a section on line 3—3 of Fig. 2. Fig. 4 is a vertical section on a plane passing through the central lines of the cylinders of the air brake pump. Fig. 5 is a section of the connector to the graphite chamber on the line 5—5 of Fig. 4. Fig. 6 is a section of the connector at the lower end of the pipe leading from this chamber to the low pressure air cylinder on the line 6—6 of Fig. 1.

Similar reference characters refer to like parts throughout the several views.

Great difficulty has been experienced with lubricators heretofore constructed for supplying proper lubricant to the steam cylinders and valves and to the air cylinders of air pumps, and the present invention is designed to so overcome these difficulties that the frequency of repairs and replacements of parts of air pumps will be greatly diminished.

In the drawings 1 is the high pressure and 2 the low pressure steam cylinder, 3 is the low pressure and 4 the high pressure air cylinder, 5 is the high and 6 is the low pressure steam piston, 7 is the low pressure and 8 the high pressure air piston, and 9 and 10 the piston rods. I have shown the screens 12 over the inlet ends of the air inlets 13 for the low pressure air cylinder 3, and it is by dropping small amounts of oil onto these screens to be drawn in by the entering air that the air cylinders and pistons are usually lubricated to-day.

Mounted above the high pressure cylinder 1 is a valve chamber 15 in which the main piston valve 16 is reciprocated in the usual manner by steam controlled by the small valve 17 mounted in the valve chamber 18. This valve is moved up and down by the piston 5 through the medium of the stem 19. The parts thus far described are well known standard construction and form no part of my present invention.

A plug 21 screws into the upper end of the valve chamber 18 and guides the stem 22 at the upper end of the valve 17. A small passage 23 permits steam to flow from the chamber 18 to the space 24 above the stem 22 and the lubricator 25 has a threaded lower end 26 which screws into a properly threaded hole leading to this space 24 in the plug 21.

As shown in Figs. 2 and 3, this lubricator is provided with three chambers 27, 28 and 29, closed by means of the plugs 31, 32 and 33. The chamber 27 is filled with fine graphite 34 and a fitting 35 screws into the bottom of this chamber, as shown in Fig. 5, and connects to the tube 36 by means of the sleeve 37. At its lower end this tube is connected to the fitting 38 by means of a sleeve 39 as shown in Fig. 6. This fitting screws into the head 40 of the low pressure air cylinder 3 and a small ball valve 42 normally closes the passage 43 in this fitting.

When the chamber 27 is filled with graphite and the air pump is started, the compressed air in the cylinder 3 lifts the small valve 42 a slight distance and the graphite from the chamber 27 which has been shaken down escapes beneath the valve into the low pressure air cylinder. A portion of this graphite is carried over with the air into the high pressure air cylinder 4. It will be understood that a similar device is applicable to single cylinder air pumps.

The second chamber 28 has a filling plug 32 to permit the introduction of dry graphite while the third chamber 29 may be filled with oil through the opening normally closed by the plug 33. A plug 44 permits the hole 45 to be drilled into the small chamber 46, which hole 45 is threaded to receive the pipe 47. A valve 48 has a handle 49 on its outer end and controls the flow of steam from the chamber 24 to the chamber 46 and the flow of lubricant in the opposite direction.

A passage 51—52 extends from the passage 45 to the nozzle 53 opening into the chamber 28, the nozzle being accurately calibrated and made removable in order that the desired size of the passage to the chamber 28 may be had. Screwed up into the body just above the threaded end 26 is a small valve seat 54 which receives the valve 55 whose upper end is fluted and slidable in the hole 56. The oil within the chamber 29 will usually remain at the level 57 of the small holes 58 in the pipe 47 and the oil will float on the water below it, the level of the water being indicated by the line 59. The operation of this device is as follows,—

The valve 48 is first closed and the chamber 25 is drained through the pet-cock 60 which connects at 61. The chambers 27 and 28 are then filled with dry graphite and the chamber 29 with lubricating oil, after which the plugs 31, 32 and 33 are screwed in and the valve 48 opened a distance which has been found most serviceable by experience.

After the pump has been set in motion, the pressure in the cylinder 3 will lift the ball valve 42 from its seat and permit air to force its way from the cylinder 3 to the chamber 27 until the pressures are equalized. This flow of air will loosen the graphite and small amounts will move down the tube 36 and will escape into the cylinder 3 around this valve 42. Being dry, the graphite will be carried to all parts of the cylinders 3 and 4 by the air compressed therein and stick to the wearing surfaces, forming a smooth frictionless coating thereon.

When the piston 7 descends a partial vacuum in the cylinder automatically draws the valve 42 down onto its seat and prevents more graphite from coming down. By having a small seat 59 just above the valve, the passage through the pipe 36 will be closed shortly after the ball 42 has been lifted so that the amount of graphite which passes the ball will be very small and unnecessary waste is thereby avoided.

Steam passing up through the passage 23 in the plug 21 and around the valve 55 into the small chamber 46 and passage 45, divides, a portion passing to the chamber 28 through the passage 51—52 and nozzle 53 and there setting up a pressure equal to that in the chamber 29. The steam that passes up through the passage 47 condenses and lifts the lubricant to the small holes 58 through which it passes into this pipe 47 and runs down to the passage 45 where it mixes with the graphite and water which have come from the chamber 28 through the passages 51—52. This mixture of oil and graphite passes to the space above the valve 56 and to the valve chamber 18 in minute quantities as the air pump operates to move the several valves from their seats. This mixed lubricant is then carried to the valve chamber 15 in the usual manner.

The construction of the valve 55 is such that when the valve 17 descends and vacuum is created thereby, the valve 55 is automatically drawn to its seat and prevents the unnecessary discharge of oil. When the piston 5 is working with steam applied, the valve is opened and closed by the pulsations of the steam allowing steam to ascend and the oil and graphite to descend to the parts to be lubricated.

By having the plugs 31, 32 and 33 so close together, there is little danger that the attendants will omit to fill all of them at the same time. The details and proportions of the various parts may all be changed without departing from the spirit of my invention set forth in the following claims.

I claim:—

1. A lubricator comprising a plurality of chambers, one adapted to receive graphite and the other to receive oil lubricant, a fitting to secure the lubricator to a steam valve and provided with a passage, said lubricator being provided with a lubricant passage from the upper part of the oil lubricant chamber and with a lubricant passage from the bottom of the graphite chamber, said passages uniting below said chambers and connecting to the passage in said fitting.

2. A lubricator comprising a plurality of chambers, one adapted to receive graphite and the other to receive oil lubricant, a fitting to secure the lubricator to a steam valve and provided with a passage, said lubricator being provided with a lubricant passage from the upper part of the oil lubricant chamber and with a lubricant passage from the bottom of the graphite chamber, said passages uniting below said chambers and connecting to the passage in said fitting, a check valve in the passage in the fitting, and a manually controlled valve to determine the size of said united passage.

3. A lubricator comprising a plurality of chambers, two of them adapted to receive finely divided graphite and the third to receive oil, a pipe leading from one of the graphite chambers to the air cylinder of an air pump, and a ball check valve at the lower end of said pipe and pipes leading from the second graphite chamber and from the oil chamber and uniting below said chambers to deliver mixed oil and graphite to the steam cylinder of the air pump.

4. A lubricator mounted on the steam valve chamber of a vertical air pump for air brake systems, comprising a plurality of chambers, one to hold oil and the other to hold graphite, said lubricator having a passage to admit steam to the bottom of the oil chamber, a pipe screwed into said passage and extending from below said chambers to near the top of the oil chamber and having fine holes near its upper end, said lubricator having a second passage connecting with the first and to the bottom of the graphite chamber, a calibrated nozzle in the bottom of the graphite chamber screwed into the upper end of the second passage, and a manually controlled valve for regulating the entrance of steam to said chambers.

5. A lubricator mounted on the steam valve chamber of a vertical air pump for air brake systems, comprising a plurality of chambers, one to hold oil and the other to hold graphite, said lubricator having a passage to admit steam to the bottom of the oil chamber, a pipe screwed into said passage and extending to near the top of the oil chamber and having fine holes near its upper end, said lubricator having a second passage connecting with the first and to the bottom of the graphite chamber, a calibrated nozzle in the bottom of the graphite chamber screwed into the upper end of the second passage, and a manually controlled valve for regulating the entrance of steam to said chambers, and a check valve between the steam valve chamber and the manually controlled valve to prevent the lubricant from passing to the steam valve chamber when the pump is at rest.

ELIJAH McCOY.